No. 625,649. Patented May 23, 1899.
B. F. DARLINGTON & E. P. CLARY.
HORSE POWER AND PUMPING JACK.
(Application filed Apr. 30, 1898.)
(No Model.)
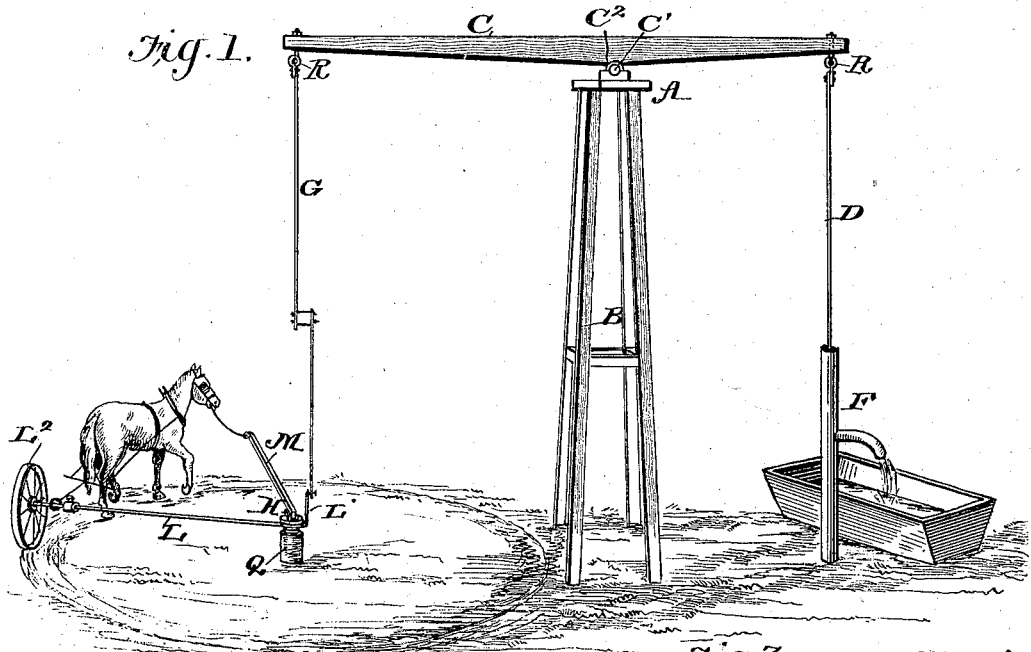
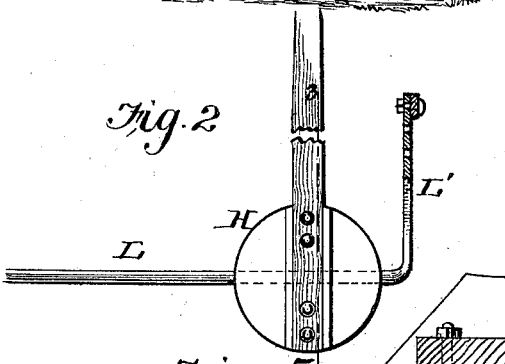
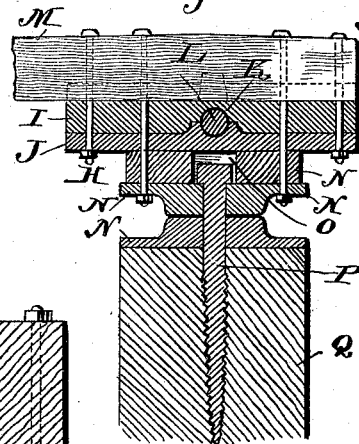
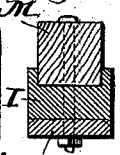
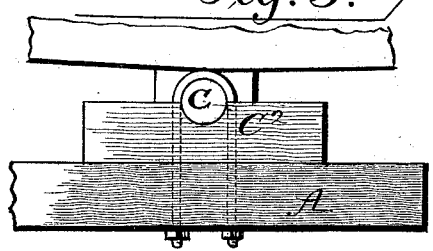
WITNESSES:
Jos. A. Ryan
P. B. Turpin
INVENTORS:
Benjamin F. Darlington
Edwin P. Clary
BY Munn & Co.
ATTORNEYS.
THE NORRIS PETERS CO., PHOTO-LITHO., WASHINGTON, D. C.

UNITED STATES PATENT OFFICE.

BENJAMIN F. DARLINGTON AND EDWIN P. CLARY, OF SAN ANTONIO, TEXAS.

HORSE-POWER AND PUMPING-JACK.

SPECIFICATION forming part of Letters Patent No. 625,649, dated May 23, 1899.

Application filed April 30, 1898. Serial No. 679,353. (No model.)

*To all whom it may concern:*

Be it known that we, BENJAMIN F. DARLINGTON and EDWIN P. CLARY, of San Antonio, in the county of Bexar and State of Texas, have invented a new and useful Improvement in a Horse-Power and Pumping-Jack Combined, of which the following is a specification.

This invention is an improvement in pumping-jacks, and has for its object, among others, to provide, in connection with a rotating head or turn-table, a sweep or shaft which rotates with the said turn-table or head and is journaled therein and has a crank connected with the pumping devices and a wheel which rolls on the ground or other suitable bearing and so operates to turn the shaft or sweep as the turn-table or head is rotated, as will more fully appear hereinafter; and the invention consists in certain novel constructions and combination of parts, as will be hereinafter described, and pointed out in the claims.

In the drawings, Figure 1 is a perspective view of our invention as in use. Fig. 2 is a plan view thereof. Fig. 3 is a sectional view on about line 3 3 of Fig. 2. Fig. 4 is a detail end view of the lead-beam, and Fig. 5 illustrates the connection of the walking-beam with the platform.

The platform A is at the top of the derrick B and supports the walking-beam C, which connects at one end with the rod D, operating in the pump F. At its other end the walking-beam connects with the pitman G, which latter connects with the crank of the shaft or sweep, presently described. In pivoting the walking-beam C it is preferably fixed to a shaft C', whose ends operate as trunnions in bearings C² on the platform A, as best shown in Fig. 5.

The turn-table or head H includes plates I and J, which are bolted together and provide between them a bearing at K, in which the sweep or shaft L is journaled to turn in the operation of the device. The lead pole or beam M is bolted to the head H, and the plates I and J are connected with the bearing-plate N, being separated therefrom by blocks N', which provide at O a space for the head of the screw or bolt P, which connects the turn-table or head with the post Q, which may be supported by driving it in the ground or otherwise, as desired.

The sweep or shaft L has adjacent to the head H a crank L', which connects with the pitman G, and on its outer end we provide the sweep L with the wheel L², which is fixed to the shaft L, so the said shaft will be turned in its bearings K as the head H is rotated in the operation of the improvements.

In operation, the horse, mule, or other animal is suitably hitched to the outer end of the sweep or shaft L and has the lead-strap connected with the pole or beam M, as shown in Fig. 1, and as the device is operated by driving the animal around the circle in ordinary horse-power style the shaft L will be rotated to cause its crank to reciprocate the pitman and so rock the walking-beam to secure the desired pumping action.

Ball-and-socket or other suitable form of swivel-joint may be provided at R, as shown in Fig. 1.

Having thus described our invention, what we claim, and desire to secure by Letters Patent, is—

1. The combination in an apparatus substantially as described of the post or support, the turn-table having plates provided with a bearing for the sweep or shaft and below said plates with a bearing-plate held to said plates, the space-blocks interposed between said plates and the bearing-plate forming a space for the head of the pivot-bolt, the pivot-bolt whereby the turn-table is held to the post or support, such bolt having a head fitted in said space and the sweep or shaft having a crank at one end and a wheel at its other end substantially as set forth.

2. The combination substantially as described of the plates I and J having between them a bearing for the shaft, the plate I being provided in its upper side with a seat for the lead-pole, the lead-pole held in said seat, the bearing-plate N, the blocks N' interposed between the plate N and the plate J, such plates and blocks being suitably held together and the blocks N' being spaced apart forming an opening for the head of the pivot-bolt, and the pivot-bolt substantially as shown and described.

BENJAMIN F. DARLINGTON.
EDWIN P. CLARY.

Witnesses:
H. THUMOND,
S. C. SELBY.